UNITED STATES PATENT OFFICE.

ADOLPH GIESECKE, OF BUFFALO, NEW YORK.

MANUFACTURE OF BAKING-POWDER.

SPECIFICATION forming part of Letters Patent No. 256,832, dated April 25, 1882.

Application filed February 10, 1882. (No specimens.)

*To all whom it may concern:*

Be it known that I, ADOLPH GIESECKE, a subject of the Emperor of Germany, residing in Buffalo, in the county of Erie and State of New York, have invented certain new and useful Improvements in the Manufacture of Baking-Powder, of which the following is a specification.

My invention relates to certain improvements in the manufacture of an acid phosphate which, when mixed with the usual or proper proportion of bicarbonate, will make a new and improved baking-powder, as will be more clearly hereinafter shown.

The best known acid salts used in the manufacture of baking-powder are cream of tartar or acid phosphate of lime. The objection to the first is its high price and rapid generation of carbonic acid; to the second, its hygroscopic condition—that is, it rapidly absorbs water or moisture and decomposes the bicarbonate. It is also objectionable as producing a too rapid generation of carbonic acid. It is necessary to adulterate the phosphate of lime with a dry substance—for instance, starch; otherwise it will lose its strength. Even when mixed with starch the rising-power does not last long. This is peculiar to almost all acid phosphates; also the quick working or too rapid generation of carbonic acid.

By this invention I produce a combination or compound which will, either by itself alone or when mixed with bicarbonate, keep dry and last for a long time without any adulteration. This combination is produced by decomposing phosphate of soda with muriatic acid in such quantity that but one atom of sodium unites with the muriatic acid. The following chemical formula will illustrate the process: $HNa_2Po_4 + HCl = H_2NaPo_4 + NaCl$. By this decomposition I form a combination of an acid phosphate and common table-salt. The phosphate of soda is made in the ordinary or well-known way by decomposing bone-ash with sulphuric acid and neutralizing the filtered liquid by soda. The neutral liquor is then boiled down to a certain gravity for crystallization. There are two ways to produce the above-mentioned combination: first, add the muriatic acid to the crystallized phosphate of soda and concentrate the liquor to a dry state; second, remove the crystal water by dry heat, about 150° Fahrenheit, and then add the muriatic acid, and dry the pasty mass at a temperature of at least 212° Fahrenheit.

I do not claim broadly an ordinary phosphate of soda; but

What I do claim is—

1. The combination, substantially as specified, of phosphate of soda and muriatic acid, whereby a dry acid salt is produced, for the purposes described.

2. The combination of said acid salt with the usual or proper proportion of bicarbonate of soda, as and for the purposes specified.

ADOLPH GIESECKE.

Witnesses:
 JAMES SANGSTER,
 R. N. SANGSTER.